(12) United States Patent
Braun et al.

(10) Patent No.: US 8,573,188 B2
(45) Date of Patent: Nov. 5, 2013

(54) CYLINDER HEAD OF AN INTERNAL COMBUSTION ENGINE

(75) Inventors: Mirko Braun, Göppingen (DE); Michael Feil, Bayreuth (DE); Edwin Hartmann, Weiler Zum Stein (DE); Stefan Ruppel, Heidelberg Emmertsgrund (DE)

(73) Assignee: Mahle International GmbH (DE)

( * ) Notice: Subject to any disclaimer, the term of this patent is extended or adjusted under 35 U.S.C. 154(b) by 852 days.

(21) Appl. No.: 12/302,634

(22) PCT Filed: Apr. 24, 2007

(86) PCT No.: PCT/EP2007/053970
§ 371 (c)(1),
(2), (4) Date: Jun. 17, 2009

(87) PCT Pub. No.: WO2007/137916
PCT Pub. Date: Dec. 6, 2007

(65) Prior Publication Data
US 2009/0250044 A1    Oct. 8, 2009

(30) Foreign Application Priority Data

May 29, 2006  (DE) .......................... 10 2006 024 817

(51) Int. Cl.
*F01M 13/04*  (2006.01)
*B01D 45/12*  (2006.01)
(52) U.S. Cl.
USPC ........................................................ 123/572
(58) Field of Classification Search
USPC ...................... 123/572–574, 41.86
See application file for complete search history.

(56) References Cited

U.S. PATENT DOCUMENTS

| RE24,650 | E | * | 5/1959 | Leach | 123/41.86 |
| 4,651,704 | A | | 3/1987 | Sekiguchi | |
| 7,455,057 | B2 | * | 11/2008 | Hochmayr et al. | 123/572 |
| 7,588,020 | B2 | | 9/2009 | Yasuhara | |
| 7,717,101 | B2 | * | 5/2010 | Beetz et al. | 123/572 |
| 2002/0083933 | A1 | * | 7/2002 | Schmid et al. | 123/572 |
| 2007/0215075 | A1 | * | 9/2007 | Hutter et al. | 123/41.86 |

FOREIGN PATENT DOCUMENTS

| DE | 4037983 | 6/1992 |
| DE | 102005042720 | 4/2006 |
| DE | 102005042725 | 4/2006 |
| DE | 102005022254 | 11/2006 |
| JP | 60-209620 | 10/1985 |

(Continued)

OTHER PUBLICATIONS

International Search Report.
English abstract for DE-102005042720.
English abstract for DE-102005042725.
English abstract for DE-4037983.

(Continued)

*Primary Examiner* — M. McMahon
(74) *Attorney, Agent, or Firm* — Rader, Fishman & Grauer PLLC

(57) ABSTRACT

The invention relates to a cylinder head (1) of an internal combustion engine, comprising at least one hollow camshaft (2) which forms an exhaust for blow-by gases containing oil mist from the crank housing and is also embodied as an oil mist pre fractionator for the preliminary separation of the oil part from these gases. Furthermore, an oil mist post-fractionator (5) is axially arranged on the end of the camshaft (2), in order to carry out an especially effective separation of oil dissolved in the blow-by gases.

4 Claims, 2 Drawing Sheets

(56) References Cited

FOREIGN PATENT DOCUMENTS

Figure 3:
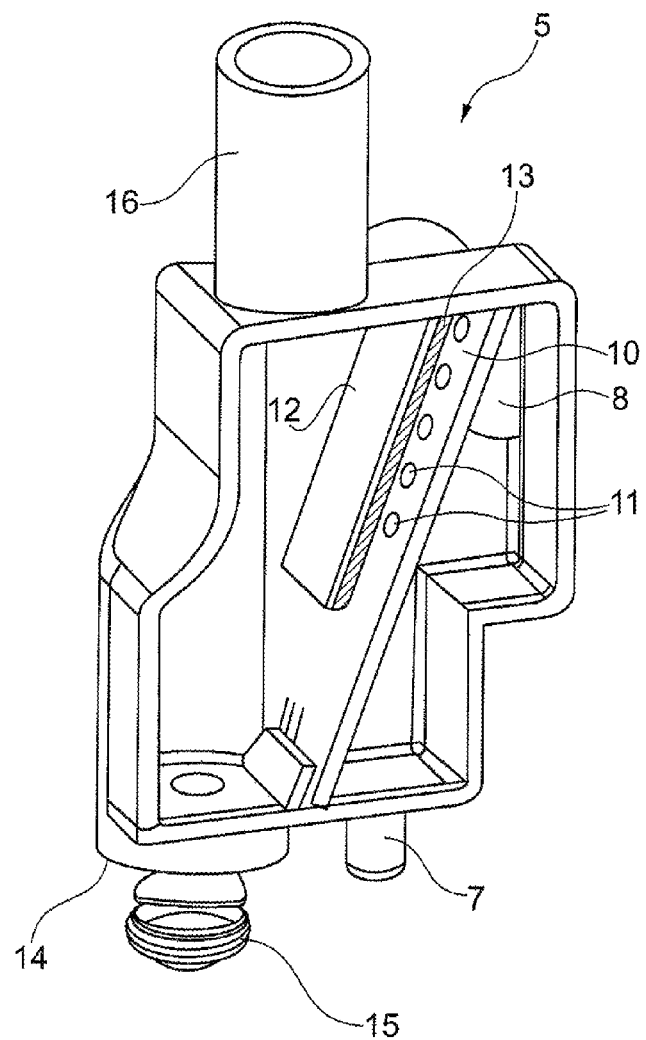

| | | |
|---|---|---|
| JP | 01-096410 | 4/1989 |
| JP | 01-122443 | 5/1989 |
| JP | 01-148009 | 9/1989 |
| JP | 07-150923 | 6/1995 |
| JP | 08-284634 | 10/1996 |
| JP | 09-291810 | 11/1997 |
| JP | 2003-301710 A | 10/2003 |
| JP | 2006-316641 A | 11/2006 |

OTHER PUBLICATIONS

English abract for DE-102005022254.
English abstract for JP-09-291810.
English abstract for JP-08-284634.
English abract for JP-07-150923.
English abtract for JP-01-148009.
English abstract for JP-01-122443.
English abstract for JP-01-096410.
English abstract provided for JP-2003-301710-A.

\* cited by examiner

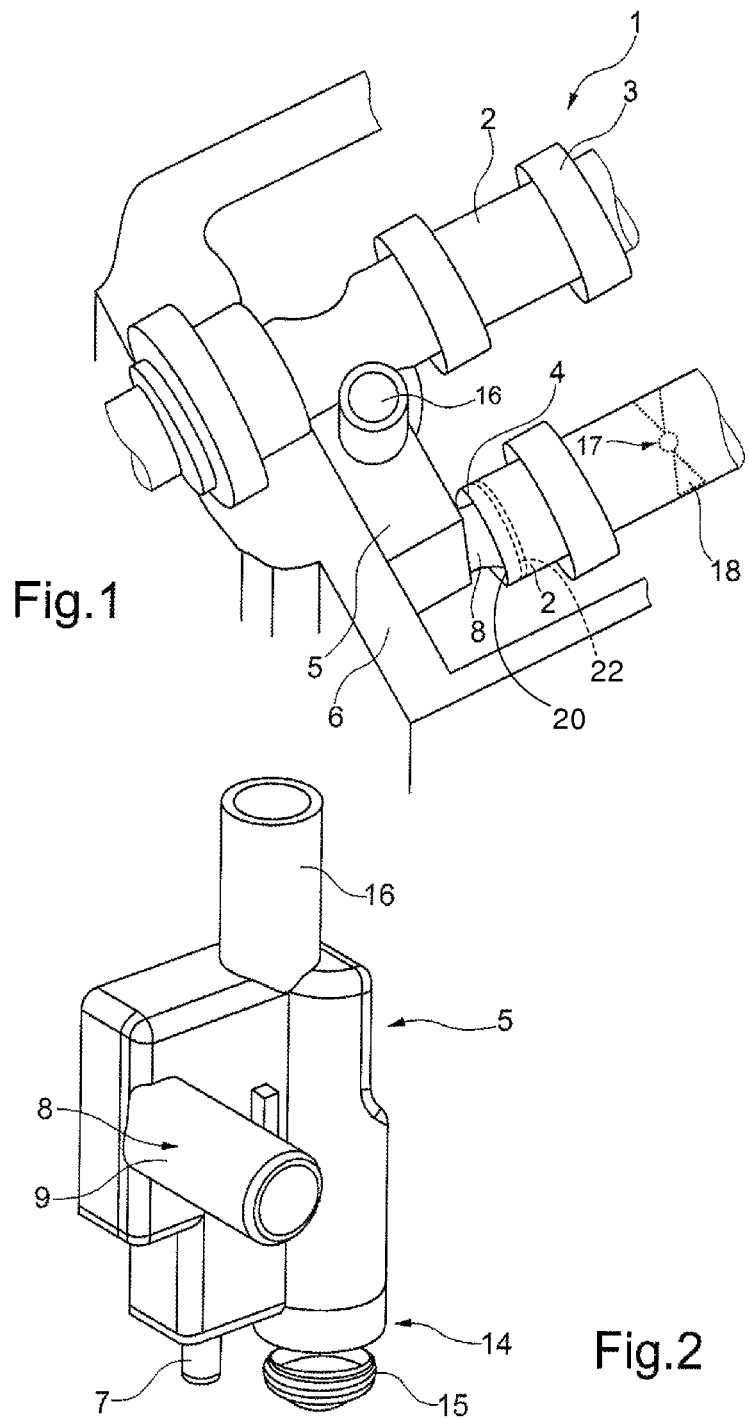

CYLINDER HEAD OF AN INTERNAL COMBUSTION ENGINE

CROSS-REFERENCES TO RELATED APPLICATION

This application is a National Stage application which claims the benefit of International Application No. PCT/EP2007/053970 filed Apr. 24, 2007, which claims priority based on German Patent Application No. DE 10 2006 24817.1, filed May 29, 2006, all of which are hereby incorporated by reference in their entirety.

The invention relates to a cylinder head of an internal combustion engine comprising at least one hollow camshaft.

From internal combustion engines is known to feed so-called blow-by gases containing oil mist from the crank housing into a hollow camshaft and to centrifugate them therein so that the oil contained in the blow-by gases deposits at an inner wall of the camshaft. The oil droplets separated such on the inner wall of the camshaft form an oil film which is transported to an axially end-side exit of the camshaft due to the gas flow existing in the camshaft. The disadvantage of the known systems is that the oil dissolved in the blow-by gases cannot be separated completely in the camshaft so that the blow-by gases leaving the crank housing still contain an undesired portion of residual oil.

The invention is concerned with the problem to further improve the oil mist separation so that the blow-by gases discharging from the crank housing have a considerably lower oil content.

This problem is solved by means of a cylinder head with all features of the patent claim 1.

Advantageous and preferred embodiments are subject matter of the dependent sub-claims.

The invention is based on the general idea to provide, in addition to the hollow camshaft, which functions as oil mist pre-fractionator, an oil mist post-fractionator, which is axially arranged on the end of the camshaft and which makes blow-by gases, which are already pre-cleaned by the camshaft, subject of a further cleaning. The invention thereby generates a two-stage cleaning concept, at the end of which blow-by gases leave the crank housing, which, compared to known oil mist separation processes in camshafts, have a considerably reduced oil content. The hollow camshaft serves therefore as oil mist pre-fractionator, while the oil mist post-fractionator is arranged right behind.

Preferably, the oil mist post-fractionator is arranged inside the crank housing. This position integrated in the crank housing allows a particularly compact construction, and, along with that, a small installation space, which in today's narrow engine compartments is of great advantage. At the same time, the oil mist post-fractionator arranged inside the crank housing is protected to a large extent from external influences, whereby its service life is positively influenced. Due to today's production methods, an outer contour, or outer form and shape, respectively, of the oil mist post-fractionator can be adapted to nearly any requirements with respect to the available installation space within the crank housing so that the previously axially available installation space on the end of the camshaft, which is not utilized, can now be utilized effectively.

In an advantageous development of the solution according to the invention, the oil mist post-fractionator is formed as an impactor or as a cyclone. Both types of oil mist separators are known from the prior art and already have proven to be effective in practice, on the one hand, and to be inexpensive, on the other hand. Here, the type of oil mist post-fractionator, in the form of an impactor, or in the form of a cyclone, can be selected depending on the space conditions available in the crank housing, whereby the available installation space can be utilized particularly effectively.

According to a further advantageous embodiment of the solution according to the invention, the oil mist post-fractionator comprises an immersion tube which projects into the hollow camshaft. The projecting of the immersion tube into the hollow camshaft is here preferably contact-free, wherein the projecting, at the same time, can provide a labyrinth seal so that the blow-by gases containing oil mist can be sucked in by the oil mist post-fractionator exclusively out of the hollow camshaft. On the other hand, it is also thinkable that between an outer circumferential surface of the immersion tube and an opposing surface of the hollow camshaft, a ring seal is arranged so that a sliding contact between the immersion tube and the camshaft exists. In order to be able to position the immersion tube exactly within the hollow camshaft, the oil mist post-fractionator is fixed connected with, in particular screwed to, the crankshaft housing.

Preferably at least a portion of an inner flow-exposed surface of an oil mist post-fractionator, which is formed as a cyclone or as an impactor, comprises a ragged or porous surface which can be formed as non-woven material or knitted fabric, and causes a particularly effective separation of oil. Such a formation of at least a portion of the inner surface, onto which a flow is applied, is here to be produced inexpensively and easy to manufacture, and improves the oil mist separation considerably.

Advantageous exemplary embodiments, which are described in more detail below, are each schematically illustrated in the drawings.

In the figures

FIG. 1 shows schematically a detailed view into the interior of a cylinder head according to the invention comprising an oil mist post-fractionator according to the invention, FIG. 2 shows schematically a perspective side view of an oil mist post-fractionator, FIG. 3 shows schematically a partial cutaway view of the oil mist post-fractionator of FIG. 2.

According to FIG. 1, a partially illustrated cylinder head 1 of an internal combustion engine, the rest of which is not illustrated, comprises two camshafts 2 and 2', whereby at least one of them is formed hollow and serves as oil mist pre-fractionator. The camshaft 2 has a plurality of cams 3, by means of which valves of the internal combustion engine, which are not shown here, are controlled. The hollow formation of the camshaft 2 allows here a transport of blow-by gases containing oil mist in its hollow space, whereby the crank housing can be bled.

By means of a rotational movement, the camshaft 2 formed as oil mist pre-fractionator causes, during the operation of the internal combustion engine, a centrifugal acceleration of the blow-by gases transported in the hollow space, whereby aerosol-dissolved oil droplets are accelerated radially outwards, and deposit on an inner surface of the hollow camshaft 2 in form of an oil film. Due to the flow of the blow-by gases within the hollow camshaft 2, the oil film is transported towards an axial end 4 of the camshaft 2 to which subsequently an oil mist post-fractionator 5 according to the invention connects. Such an oil mist post-fractionator 5 is illustrated in detail according to the FIGS. 2 and 3. The transport of the blow-by gases in the camshaft 2 is here preferably carried out by generation of a negative pressure.

As shown in FIG. 1, the oil mist post-fractionator 5 is connected with, in particular screwed to, the crank housing 6, or the cylinder head 1, respectively. Furthermore, the connection can be stabilized by means of a push fit, whereby a pin 7 of the oil mist separator 5 (cf. FIG. 2) engages in a corresponding recess at the crank housing 6, or the cylinder head 1, respectively. As also can be seen in FIG. 1, the oil mist post-fractionator 5 is arranged space-saving within the crank housing 6 so that outside of the crank housing 6 no additional space is required. By means of the camshaft 2 formed as oil mist pre-fractionator comprising the subsequently connected oil mist post-fractionator 5, hence a multi-stage oil mist separation concept is provided, which ensures a particularly effective separation of oil dissolved in the blow-by gases so that the blow-by gases leaving the crank housing 6 have a particularly high purity level.

In general, the oil mist post-fractionator can be formed here as impactor or as cyclone. In case of an oil mist post-fractionator 5 formed as impactor, the same comprises an immersion tube 8, which, as shown in FIG. 1, projects into the hollow camshaft 2. The immersion tube 8 projecting into the camshaft 2, together with the camshaft 2, forms a labyrinth seal 20 which ensures that the blow-by gas to be cleaned is exclusively sucked from the camshaft 2 and not from a crank housing interior. For this, the immersion tube 8 represents of course only one possible form of a labyrinth seal 20 so that also other forms, for example an immersion sleeve which encloses the camshaft 2, shall be covered by the invention. In addition, it is thinkable that between outer circumferential surface 9 of the immersion tube 8 and an inner surface of the hollow camshaft 2, a ring seal 22 is arranged which is in a sliding contact with the outer circumferential surface 9 of the immersion tube 8, or with the inner surface of the hollow camshaft 2. Such ring seals are inexpensive to produce, and allow in addition a sealing between the camshaft 2 and the immersion tube 8. Of course, combinations of a labyrinth seal 20 and a ring seal 22 can be provided as well.

If the transition between the camshaft 2 and the immersion tube 8 is formed as labyrinth seal with an annular gap, then, within the hollow camshaft 2, in addition, a ventilation device 17 can be provided, for example of the type of the ventilation device disclosed in DE 10 2005 042 720 A1, which, in the region of the transition between the camshaft 2 and the immersion tube 8, generates at least a slight over-pressure with respect to the pressure present in the crank housing 6 so that a suction of blow-by gases out of the crank housing 6, is avoided. Thinkable is here a ventilation device 17 which comprises fan blades 18 which are fixed connected to an inner surface of the hollow camshaft 2. Here, the number of revolutions of the camshaft (2) is so high that an axial volume flow of the fan blades fixed connected to the camshaft 2 is higher than a negative pressure generated by the suction of the blow-by gases.

Below, an oil mist post-fractionator 5 formed as impactor is to be briefly illustrated in more detail by means of FIGS. 2 and 3.

As illustrated in FIG. 3, the oil mist post-fractionator 5 comprises a perforated wall 10, which has a plurality of flow nozzles 11, thereby accelerating the blow-by gas entered through the immersion tube 8 into the oil mist post-fractionator 5. The number of flow nozzles 11, or the orientation of the perforated wall 10, respectively, is illustrated in FIG. 3, exemplified only so that a different number of flow nozzles 11, or a different orientation or formation of the perforated wall 10, respectively, is to be comprised by the invention.

Downstream and opposite to the flow nozzles 11, in the oil mist post-fractionator 5, a deflector wall 12 is provided, which is formed for collecting of oil. To improve the separation of oil at the deflector wall 12, a side of the deflector wall 12 facing the flow nozzles 11 or the perforated wall 10, respectively, comprises a ragged or porous surface, which, for example, can be provided with a non-woven material 13, or a knitted fabric 13 or a fabric, respectively. The oil separated by the non-woven material 13 or the deflector wall 12, respectively, drips downwards after reaching the saturation limit of the non-woven material 13, and flows to a discharge 14, which, according to FIG. 2, can be provided with a valve 15. For this, the valve 15 can be formed, for example, as a check valve. The cleaned blow-by gases leave the oil mist post-fractionator 5 through an outlet tube 16.

As an alternative to the oil mist post-fractionator 5 formed as an impactor, as mentioned above, an oil mist post-fractionator formed as a cyclone can be provided as well. In such an oil mist post-fractionator, the oil is discharged due to the centrifugal acceleration within the oil mist post-fractionator, wherein for increase of the oil mist separation effect, at least a portion of the inner flow-exposed surface of the oil mist post-fractionator formed as a cyclone can comprise a rough, that is, a ragged or porous surface, respectively. Comparable to the oil mist post-fractionator 5 formed as impactor, the porous surface can be formed by a non-woven material or a knitted fabric, respectively, or a fabric, or can be covered by such.

All features illustrated in the description and in the following can be essential for the invention, individually, as well as combined in any form.

The invention claimed is:

1. An internal combustion engine with a cylinder head, comprising:
   at least one hollow camshaft;
   a crank housing, the at least one hollow camshaft taking in blow by gases containing oil mist from the crank housing, and where the at least one hollow camshaft is also an oil mist pre-fractionator for preliminary separation of oil from the blow by gases, and
   an oil mist post-fractionator that is subsequently and axially arranged on the end of the camshaft, and where the oil mist post-fractionator is arranged inside the crank housing, and wherein the oil mist post-fractionator is formed as an impactor,
   wherein at least one of the following is selected:
   i. the oil mist post-fractionator comprises an immersion tube projecting into the hollow camshaft, and
   ii. wherein at least one of the following is selected:
      a. an immersion tube of the oil mist post-fractionator, together with the hollow camshaft, forms a labyrinth seal, and
      b. between an outer circumferential surface of an immersion tube and an inner surface of the hollow camshaft, a ring seal is arranged.

2. The engine according to claim 1, wherein the oil mist post-fractionator is connected with the crank housing.

3. The engine according to claim 1, where in the hollow camshaft, a ventilation device for generation of an axial volume flow is arranged.

4. The engine according to claim 2, where in the hollow camshaft, a ventilation device for generation of an axial volume flow is arranged.

* * * * *